US012627454B2

(12) United States Patent
    Zhao

(10) Patent No.: US 12,627,454 B2
(45) Date of Patent: May 12, 2026

(54) COMMUNICATION METHOD, APPARATUS AND DEVICE AND STORAGE MEDIUM

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 713 days.

(21) Appl. No.: 18/091,494

(22) Filed: Dec. 30, 2022

(65) Prior Publication Data

US 2023/0198727 A1     Jun. 22, 2023

Related U.S. Application Data

(63) Continuation of application No. PCT/CN2020/105615, filed on Jul. 29, 2020.

(51) Int. Cl.
    *H04L 5/00*          (2006.01)
    *H04W 72/0453*     (2023.01)

(52) U.S. Cl.
    CPC .......... *H04L 5/0073* (2013.01); *H04L 5/0005* (2013.01); *H04L 5/0048* (2013.01); *H04W 72/0453* (2013.01)

(58) Field of Classification Search
    CPC .... H04L 5/0073; H04L 5/0005; H04J 11/005; H04W 72/0453
    See application file for complete search history.

(56) References Cited

U.S. PATENT DOCUMENTS

2015/0230226 A1*  8/2015  Yoshizawa ............ H04W 76/14
                                                          370/329
2021/0212023 A1*  7/2021  Zeng ....................... H04W 4/48

FOREIGN PATENT DOCUMENTS

| CN | 1571512 | A | 1/2005 |
|----|---------|---|--------|
| CN | 101827307 | A | 9/2010 |
| CN | 101945334 | A | 1/2011 |
| CN | 102214360 | A | 10/2011 |
| CN | 104798424 | A | 7/2015 |

(Continued)

OTHER PUBLICATIONS

Decision of Rejection issued in corresponding Chinese Application No. 202310480899.0, mailed on Dec. 30, 2024, 20 pages.

(Continued)

*Primary Examiner* — Brian T Le
(74) *Attorney, Agent, or Firm* — BAYES PLLC

(57)                ABSTRACT

The present application provides a communication method, apparatus and device and a storage medium. A first communication device determines a first time-domain resource used by a first communication group where the first communication device is located, and communicates with other communication devices in the first communication group by using the first time-domain resource. The first time-domain resource used by the first communication group is different from a second time-domain resource used by a second communication group, and the first communication group and the second communication group are any two of a plurality of communication groups coexisting in a target communication system.

17 Claims, 7 Drawing Sheets

(56) References Cited

FOREIGN PATENT DOCUMENTS

| | | | |
|---|---|---|---|
| CN | 105991271 | A | 10/2016 |
| CN | 107690127 | A | 2/2018 |
| CN | 108029125 | A | 5/2018 |
| CN | 109257826 | A | 1/2019 |
| CN | 110545524 | A | 12/2019 |
| CN | 115606280 | A | 1/2023 |
| JP | 2018527853 | A | 9/2018 |
| WO | 2014087720 | A1 | 6/2014 |
| WO | 2014129357 | A1 | 8/2014 |
| WO | 2017037047 | A1 | 3/2017 |
| WO | 2019244256 | A1 | 12/2019 |
| WO | 2020148291 | A1 | 7/2020 |

OTHER PUBLICATIONS

International Search Report issued in International application No. PCT/CN2020/105615, mailed Apr. 25, 2021.

Written Opinion of the International Searching Authority issued in International application No. PCT/CN2020/105615, mailed Apr. 25, 2021.

Spreadtrum Communications, "Discussion on physical layer structure for sidelink", R1-1906361, 3GPP TSG RAN WG1 #97 Reno, USA, May 13-17, 2019.

Extended European Search Report issued in corresponding European application No. 20947263.8, mailed Jul. 27, 2023.

First Office Action issued in corresponding European application No. 20947263.8, mailed Apr. 19, 2024.

First Office Action issued in corresponding Indian application No. 202317009788, mailed Apr. 30, 2024.

First Office Action issued in corresponding Japanese application No. 2023-503507, mailed Jun. 21, 2024.

Title: Discussion on UE autonomous RA in NR-V2X; Source: OPPO 3GPP TSG-RAN WG1 Meeting #96 R1-1902389 Athens, Greece Feb. 25-Mar. 1, 2019.

Source: Fraunhofer HHI, Fraunhofer IIS; Title: NR V2X Uu-based Resource Allocation 3GPP TSG RAN WG1 #96 R1-1901845 Athens, Greece, Feb. 25-Mar. 1, 2019.

Notice of Priority Examination of Patent Application issued in corresponding Chinese Application No. 202310480899.0, mailed on Jul. 31, 2024, 6 pages.

First Office Opinion Notice issued in Chinese Application No. 202310480899.0, mailed Aug. 2, 2024, 24 pages.

Communication pursuant to Article 94(3) EPC issued in corresponding European Application No. 20947263.8, mailed Oct. 8, 2024, 4 pages.

Decision to Grant a Patent issued in corresponding Japanese Application No. 2023-503507, mailed on Oct. 8, 2024, 7 pages.

Second Examination Opinion Notice issued in Chinese Application No. 202310480899.0, mailed Oct. 10, 2024, 22 pages.

First Office action issued in corresponding Korean Application No. 10-2023-7005908, mailed Jul. 18, 2025, 10 pages.

"Physical Layer Structure for NR V2X Sidelink", Agenda Item: 7.2.4.1, Source: InterDigital, Inc., 3GPP TSG RAN WG1 #99, R1-1912738, Reno, USA, Nov. 18-22, 2019, 12 pages.

"Discussion on Basic Resource Allocation Methods for NR-V2X Sidelink Communication", Agenda item: 7.2.4.1.5, Source: Fujitsu, 3GPP TSG RAN WG1 #96, R1-1901946, Athens, Greece, Feb. 25-Mar. 1, 2019, 14 pages.

"Considerations on resource management for NR V2X", Agenda Item: 11.4.2.2, Source: Huawei, HiSilicon, 3GPP TSG-RAN WG2 # 105, R2-1902043, Athens, Greece, Feb. 25-Mar. 1, 2019, 5 pages.

* cited by examiner

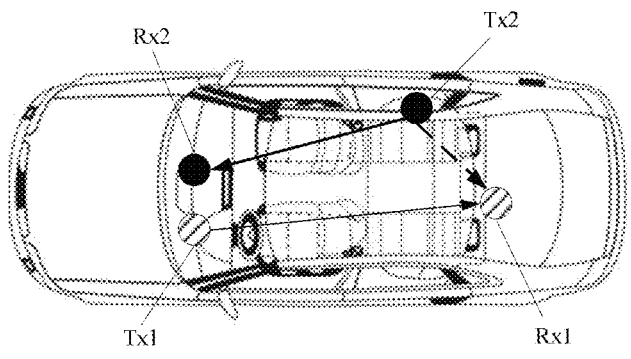

FIG. 9 determining a first time-domain resource used by a first communication group where the first communication device is located, wherein the first time-domain resource used by the first communication group is different from a second time-domain resource used by a second communication group, and the first communication group and the second communication group are any two of a plurality of communication groups coexisting in the target communication system    S101 communicating with other communication devices in the first communication group using the first time-domain resource    S102

FIG. 10

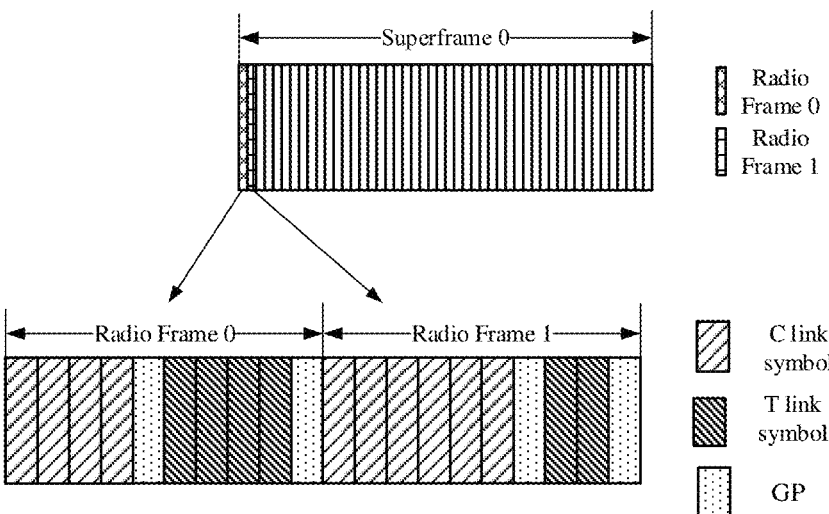

FIG. 11

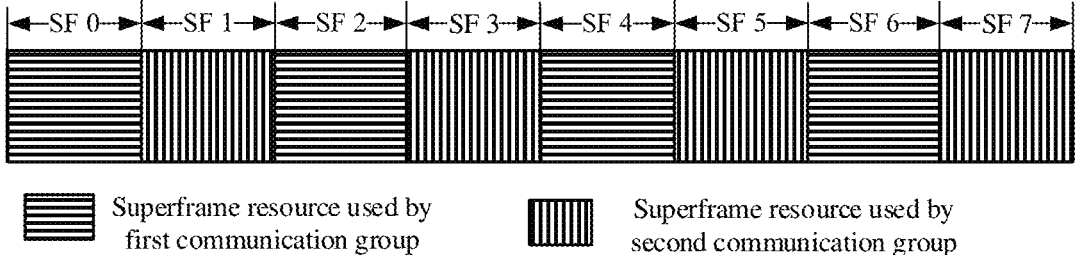

Superframe resource used by
first communication group

Superframe resource used by
second communication group

FIG. 12

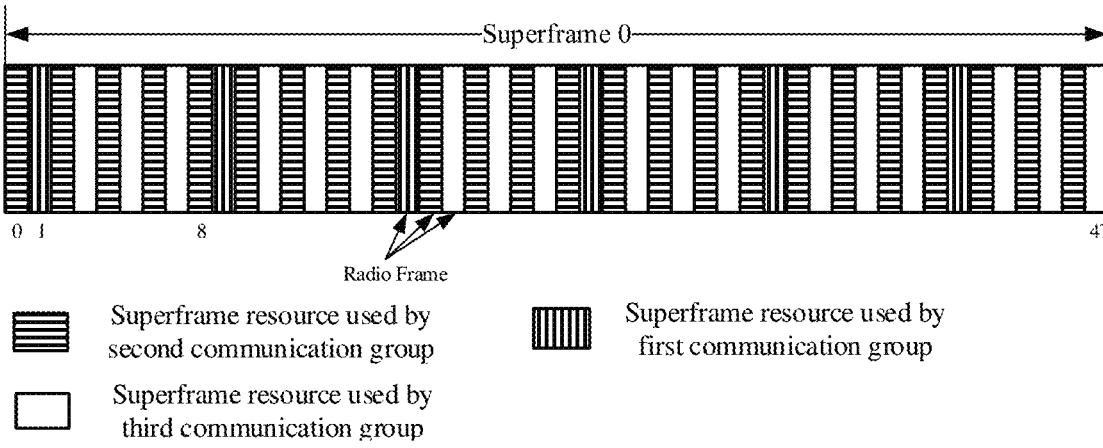

Superframe resource used by
second communication group

Superframe resource used by
first communication group

Superframe resource used by
third communication group

FIG. 13

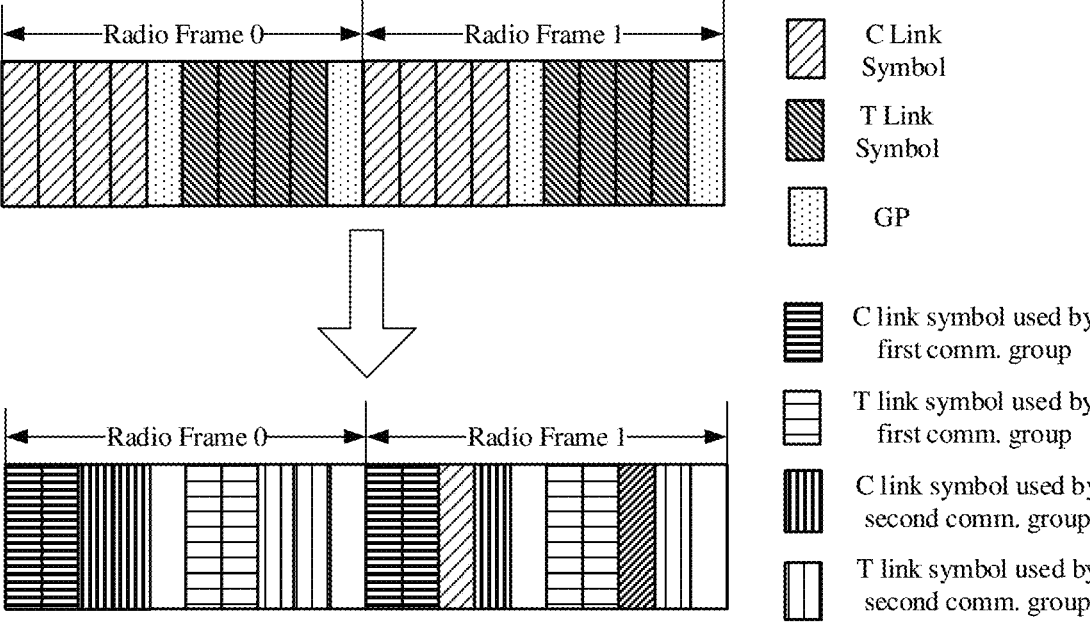

C Link
Symbol

T Link
Symbol

GP

C link symbol used by
first comm. group

T link symbol used by
first comm. group

C link symbol used by
second comm. group

T link symbol used by
second comm. group

FIG. 14

COMMUNICATION METHOD, APPARATUS AND DEVICE AND STORAGE MEDIUM

CROSS REFERENCE

The present application is a continuation of International Application No. PCT/CN2020/105615, filed on Jul. 29, 2020, and the entire contents thereof are incorporated herein by reference.

TECHNICAL FIELD

The present disclosure relates to the field of communication technologies, and in particular, to a communication method, apparatus, device, and storage medium.

BACKGROUND

In the related art, multiple communication groups may exist simultaneously in a certain area, and each communication group includes multiple communication devices, for example, terminals.

In a multi-communication group communication system, the multiple communication groups usually use the same wireless transmission method for intra-group communication. If multiple communication groups are in the same carrier, then when the communication devices in a certain communication group communicate with each other, it may affect the communication between communication devices in other communication groups, and there is a problem of interference between communication groups.

SUMMARY

Embodiments of the present application provide a communication method, apparatus, device, and storage medium.

In a first aspect, the embodiment of the present application provides a communication method, which is applied to a first communication device, and the method includes:

determining a first time-domain resource used by a first communication group where the first communication device is located, where the first time-domain resource used by the first communication group is different from a second time-domain resource used by a second communication group, and the first communication group and the second communication group are any two of a plurality of communication groups coexisting in a target communication system; and communicating with other communication devices in the first communication group using the first time-domain resource.

In a second aspect, the embodiment of the present application provides a communication apparatus, including: a processing module and a transceiver module;

the processing module is configured to determine a first time-domain resource used by a first communication group where a first communication device belongs, the first time-domain resource used by the first communication group and a second time-domain resource used by a second communication group are different, the first communication group and the second communication group are any two of a plurality of communication groups coexisting in a target communication system; and the transceiver module is configured to communicate with other communication devices in the first communication group using the first time-domain resource.

In a third aspect, the embodiment of the present application provides a communication apparatus, the apparatus includes a processor, and the processor is used to call and run a computer program from a memory, so that a device installed with the apparatus executes the communication method described in the first aspect.

In a fourth aspect, the embodiment of the present application provides a communication device, including: a processor, a memory, and computer instructions stored on the memory and operable on the processor, and when the computer instructions are executed by the processor, the method described in the first aspect is implemented.

In a fifth aspect, the embodiment of the present application provides a computer-readable storage medium, wherein a computer program is stored in the computer-readable storage medium, and when the computer program is executed by a processor, the method described in the first aspect is implemented.

In a sixth aspect, the embodiment of the present application provides a computer program product, including computer instructions, and when the computer instructions are executed by a computer, the method described in the first aspect is implemented.

In a seventh aspect, the embodiment of the present application provides a computer program, and when the computer program is executed by a computer, the method described in the first aspect is implemented.

In an eighth aspect, the embodiment of the present application provides a chip for running instructions, the chip includes a memory, and a processor, wherein codes and data are stored in the memory, the memory is coupled to the processor, and the processor runs the codes in the memory to enable the chip to execute the method described in the first aspect above.

In a ninth aspect, the embodiment of the present application provides a communication system, including: at least one communication device, wherein the communication device includes the communication apparatus described in the second aspect above.

BRIEF DESCRIPTION OF THE DRAWINGS

FIG. 9 is a schematic diagram of the first communication group and the second communication group performing sidelink communication in an FDM manner;

FIG. 10 is a schematic flowchart of Embodiment 1 of the communication method provided by the embodiment of the present application;

FIG. 11 is a schematic diagram of a frame structure in a short-distance communication system in a vehicle;

FIG. 12 is a diagram of the distribution of different superframes used between communication groups in the short-distance wireless communication system;

FIG. 13 is a diagram of the distribution of different radio frames used between communication groups in the short-distance wireless communication system;

FIG. 14 is a diagram of the distribution of different time-domain symbols used between communication groups in the short-distance wireless communication system;

DETAILED DESCRIPTION

Figure 1:
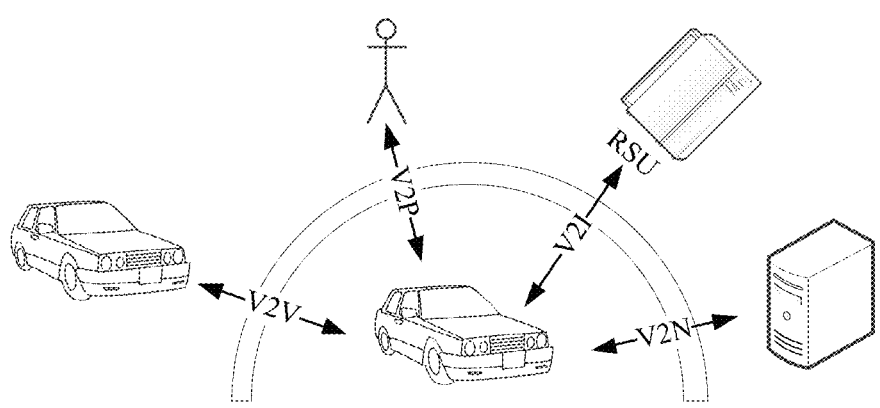
FIG. 1 is a schematic diagram of the architecture of V2X communication.

In order to make the purposes, technical solutions and advantages of the embodiments of the present application clearer, the technical solutions in the embodiments of the present application will be clearly and completely described below in conjunction with the drawings in the embodiments of the present application. Obviously, the described embodiments are a part of the embodiments of this application, rather than all embodiments. Based on the embodiments in this application, all other embodiments obtained by persons of ordinary skill in the art without making creative efforts belong to the scope of protection of this application.

The terms "first", "second" and the like in the description, claims, and above-mentioned drawings of the embodiments of the present application are used to distinguish similar objects, and are not necessarily used to describe a specific sequence or sequence. It is to be understood that the data so used are interchangeable under appropriate circumstances such that the embodiments of the application described herein can be practiced in sequences other than those illustrated or described herein. Furthermore, the terms "comprising" and "having", as well as any variations thereof, are intended to cover a non-exclusive inclusion, for example, a process, method, system, product or device comprising a sequence of steps or elements is not necessarily limited to the expressly listed, and instead, may include other steps or elements not explicitly listed or inherent to the process, method, product or apparatus.

With the development of network technology and intelligent vehicle technology, the Internet of Vehicles has attracted more and more attention. Device-to-device communication is a sidelink transmission technology based on D2D. It is different from the way communication data is received or sent through the base station in the traditional LTE system (cellular system). The Internet of Vehicles system adopts the method of terminal-to-device direct communication, with higher spectral efficiency and lower transmission delay.

In the third-generation partnership project (3rd generation partnership project, 3GPP), D2D is classified into different stages for research, as follows.

Proximity based services (ProSe): It is mainly used to improve spectrum utilization and reduce base station load. Specifically, the terminal communicates directly through the spectrum resources allocated by the base station, thereby improving the utilization of wireless spectrum resources. After the adjacent service between terminals is successfully established, device-to-device communication can be performed, and the load on the base station is reduced. It is mainly aimed at public security services.

Vehicle-to-everything (V2X): The vehicle-to-everything communication system has been studied, and it is mainly oriented to relatively high-speed mobile vehicle-to-vehicle and vehicle-to-human communication services.

Wearable device (FeD2D): It is mainly used in scenarios where wearable devices access the network through mobile terminals, and it is mainly oriented to scenarios with low mobile speed and low power access.

Hereinafter, the schematic diagram of the V2X communication architecture is briefly introduced.

At present, in the Internet of Vehicles system, the Internet of Vehicles terminal realizes the interaction of intelligent information between vehicles and X (vehicles, people, traffic roadside infrastructure and networks) through vehicle-to-everything (V2X) wireless communication technology. The interaction modes of V2X communication include: between vehicles and vehicles (vehicle to vehicle, V2V), between vehicles and roadside infrastructure (vehicle to infrastructure, V2I), between vehicles and pedestrians (vehicle to pedestrian, V2P), between vehicles and the network (vehicle to network, V2N). Exemplarily, the roadside infrastructure may be a roadside unit (RSU).

FIG. 1 is a schematic diagram of the architecture of V2X communication. As shown in FIG. 1, V2X communication includes V2V communication, V2P communication, V2I communication, and V2N communication. During V2X communication, V2X services are transmitted through sidelinks or Uu ports.

In practical applications, V2X realizes typical application scenarios such as information services, traffic safety, and traffic efficiency by means of all-round connections and efficient information interaction with people, vehicles, roads, and cloud platforms. The Internet of Vehicles terminal can obtain various information services through V2I and V2N communication, including traffic light information, nearby vehicle information, vehicle navigation, emergency rescue, infotainment services, etc. Through V2V and V2P communication, the speed, location, driving situation and pedestrian activities of surrounding vehicles can be obtained in real time, and the collision warning function can be realized through intelligent algorithms to avoid traffic accidents. Through V2I communication, functions such as vehicle speed guiding can be realized to improve traffic efficiency.

Optionally, sidelink communication is different under different network coverage environments. Specifically, in the sidelink communication, according to the network coverage of the communicating terminal, it can be classified into sidelink communication with network coverage, sidelink communication with partial network coverage, and sidelink communication without network coverage.

Figure 2:
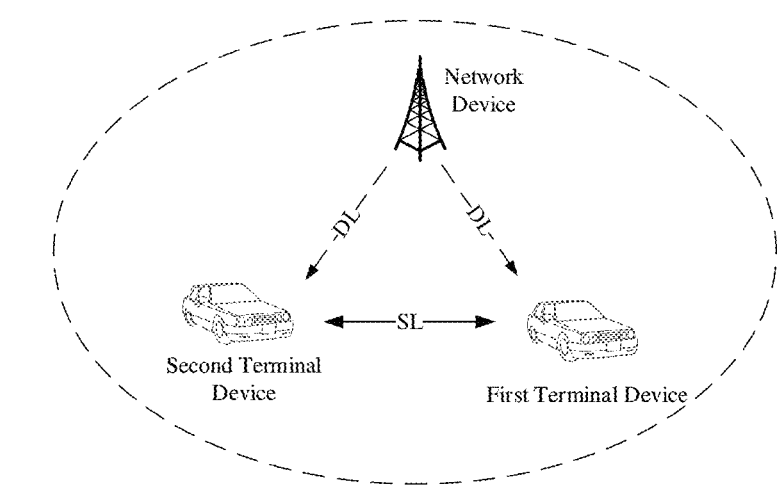
FIG. 2 is a system architecture diagram of sidelink communication within network coverage.

As an example, FIG. 2 is a system architecture diagram of sidelink communication within network coverage. As shown in FIG. 2, in sidelink communication within network coverage, all terminals performing sidelink communication (for example, the first terminal device and the second terminal device in FIG. 2) are covered by the same network device (base station). Therefore, these terminals can all receive configuration instructions sent by the network device, and perform sidelink communication based on the same sidelink configuration information.

Figure 3:
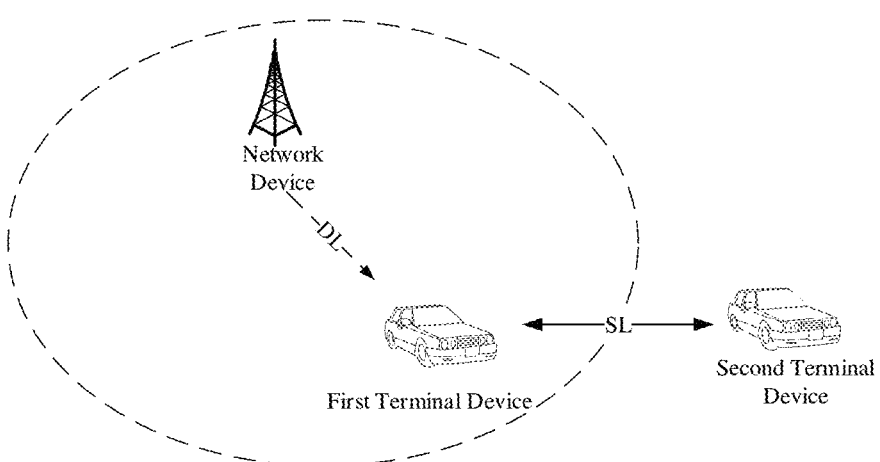
FIG. 3 is a system architecture diagram of sidelink communication with partial network coverage.

As another example, FIG. 3 is a system architecture diagram of sidelink communication with partial network coverage. As shown in FIG. 3, in the case of sidelink communication with partial network coverage, only some terminals performing sidelink communication are located within the coverage of network device (base stations), and these terminals can receive configuration signaling sent by network device, and perform sidelink communication according to the configuration signaling.

It can be understood that, in this example, terminals located outside the network coverage cannot receive configuration signaling from the base station. At this time, terminals outside the network coverage will determine the sidelink configuration information according to pre-configuration information and the information carried by the physical sidelink broadcast channel (PSBCH) received from the terminal in the network coverage, and then performs sidelink communication based on the sidelink configuration information.

For example, in the system shown in FIG. 3, the first terminal device is located within the coverage of the network device, and the second terminal device is located outside the coverage of the network. Therefore, the first terminal device can perform sidelink communicate with the second terminal device based on the configuration signaling received from the base station, while the second terminal device will determine the sidelink configuration information according to the pre-configuration information and the information carried by the PSBCH received from the first terminal, and then performs the sidelink communicate with the first terminal device.

Figure 4:
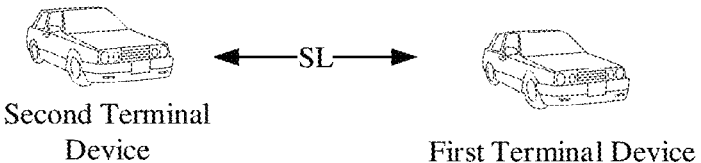
FIG. 4 is a system architecture diagram of the sidelink communication outside the network coverage.

As yet another example, FIG. 4 is a system architecture diagram of sidelink communication outside network coverage. As shown in FIG. 4, in the sidelink communication without network coverage, all terminals (the first terminal device and the second terminal device) performing sidelink communication are located outside the network coverage, and at this time, all terminals (the first terminal device and the second terminal device) determine the sidelink configuration information according to the pre-configuration information, and then perform sidelink communication based on the sidelink configuration information.

Figure 5:
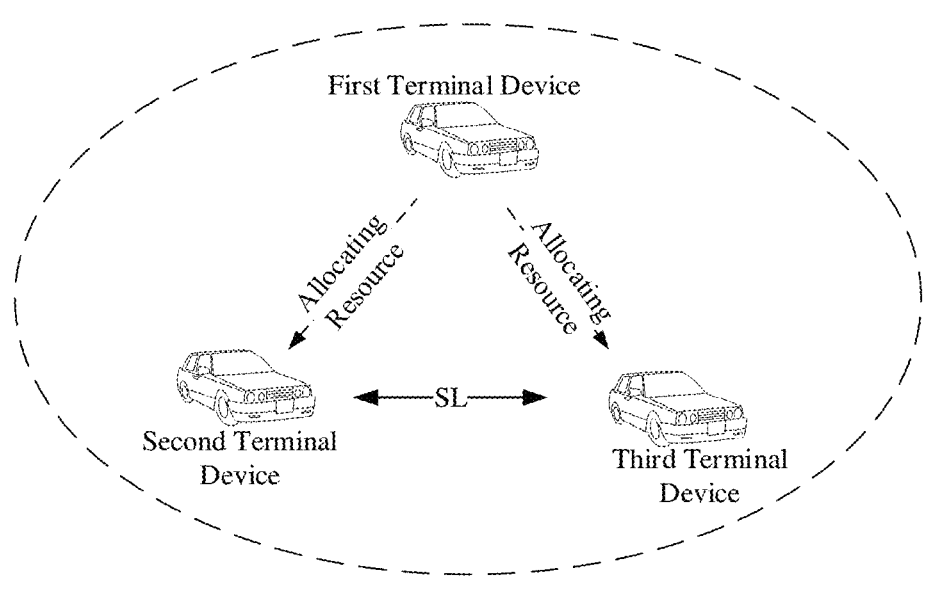
FIG. 5 is another system architecture diagram of sidelink communication outside network coverage.

As yet another example, FIG. 5 is another system architecture diagram of sidelink communication out of network coverage. As shown in FIG. 5, for sidelink communication with a central control node, that is, multiple terminal devices form a communication group, and there is a central control node in the communication group, which can also be called a cluster header terminal (cluster header, CH), and wherein the central control node has one of the following functions: responsible for the establishment of communication groups; joining and leaving of group members; performing resource coordination, allocating sidelink transmission resources for other terminals, receiving sidelink feedback information from other terminals; communicating with other communication groups for resource coordination, and other functions.

Exemplarily, in FIG. 5, the first terminal device, the second terminal device, and the third terminal device form a communication group, and the first terminal device is the cluster header of the communication group, that is, the central control node. The first terminal device may allocate resources to the second terminal device and the third terminal device respectively, so that the second terminal device and the third terminal device can perform sidelink communication.

Optionally, in the above systems shown in FIGS. 2 to 5, the first terminal device and the second terminal device are terminal devices capable of V2X communication, and are used to perform V2X communication. The first terminal device and the second terminal device performs the V2X communication through the wireless communication interface, and the first terminal device and the network device, or the second terminal device and the network device communicate through the wireless communication interface. For the sake of clarity, the wireless communication interface between the first terminal device and the second terminal device is referred to as a first air interface, and the first air interface is, for example, sidelink, the wireless communication interface between the first terminal device and the network device or between the second terminal device and the network devices is referred to a second air interface, and the second air interface is, for example, a Uu interface.

Optionally, the Internet of Vehicles system adopts a terminal-to-terminal direct communication method. Specifically, in a scenario with network coverage, 3GPP defines two transmission modes: the first mode and the second mode.

The first mode: the transmission resource of the terminal device is allocated by the network device (base station), and the terminal device sends data on the sidelink according to the resources allocated by the network device; the network device can allocate resources for a single transmission to the terminal device, and resources for semi-static transmission may also be allocated to the terminal device, which will not be specified here. In the system shown in FIG. 2 above, both the first terminal device and the second terminal device are located within the coverage of the network, and the network device allocates transmission resources for sidelink transmission to each terminal device.

The second mode: the terminal device selects a resource from the resource pool for data transmission. In the system shown in FIG. 3 above, the first terminal device and the second terminal device can select transmission resources in the resource pool by listening, or select transmission resources in the resource pool by random selection. Regarding the manner in which the first terminal device and the second terminal device select transmission resources, it may be determined according to actual conditions, and details will not be described here.

It is worth noting that, in a scenario without network coverage, the terminal device uses the above-mentioned second mode for transmission, and at this time, the resource pool is obtained through pre-configuration. The specific transmission mode is the same as the above-mentioned second mode, and will not be repeated here.

With the continuous development of technology, a new radio (NR) communication system is currently introduced, and V2X in the NR system is referred to as NR-V2X. In the NR-V2X system, it is expected to support automatic driving. Therefore, higher requirements are put forward for data interaction between vehicle terminals, such as higher throughput, lower delay, higher reliability, larger coverage, more flexible resource allocation, and more.

Optionally, LTE-V2X supports a broadcast transmission mode, and NR-V2X can support not only a broadcast transmission mode, but also a unicast and multicast transmission mode.

Figure 6:
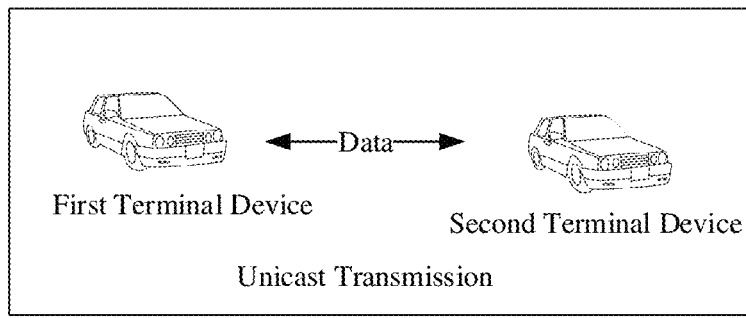
FIG. 6 is a schematic diagram of a unicast transmission mode between terminals.

Exemplarily, FIG. 6 is a schematic diagram of a unicast transmission manner between terminals. For the unicast transmission mode, each sending terminal corresponds to only one receiving terminal. As shown in FIG. 6, unicast transmission is performed between the first terminal device and the second terminal device.

Figure 7:
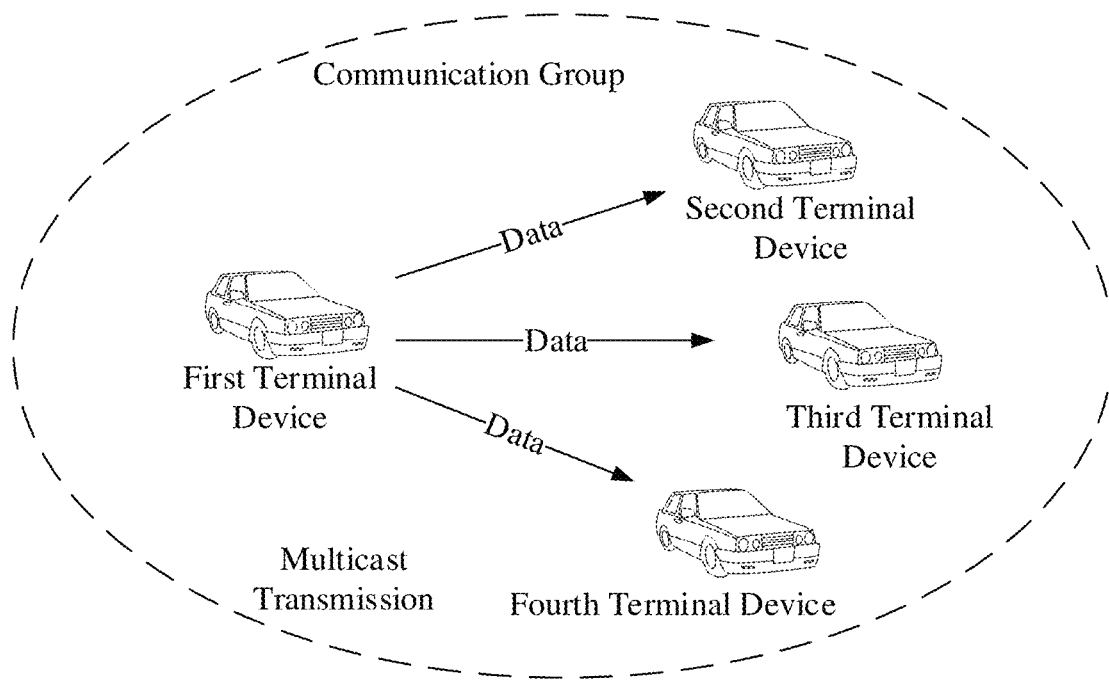
FIG. 7 is a schematic diagram of a multicast transmission mode between terminals.

Optionally, FIG. 7 is a schematic diagram of a multicast transmission manner between terminals. For the multicast transmission mode, each sender terminal may correspond to all terminals in a communication group or all terminals within a certain transmission distance. As shown in FIG. 7, the first terminal device, the second terminal device, the third terminal device, and the fourth terminal device form a communication group. Wherein, when the first terminal device sends data as the sending terminal, the other terminal devices (the second terminal device, the third terminal device, and the fourth terminal device) in the communication group are all receiving terminal devices.

Figure 8:
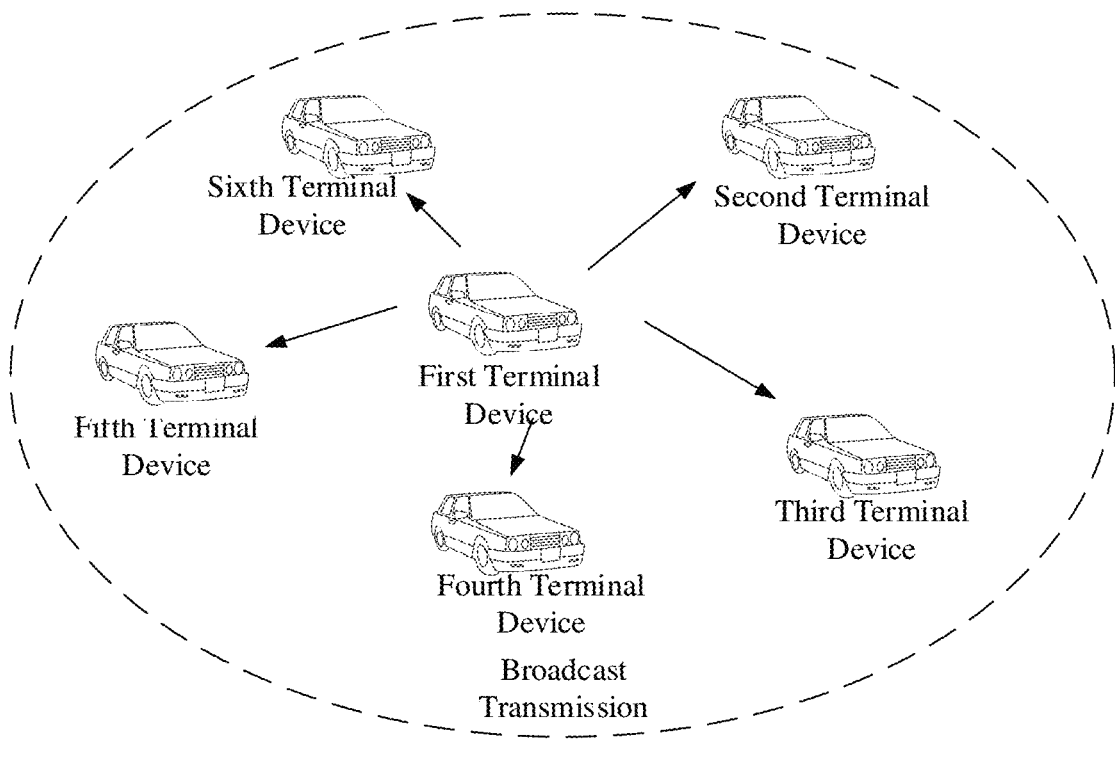
FIG. 8 is a schematic diagram of a broadcast transmission mode between terminals.

Optionally, FIG. 8 is a schematic diagram of a broadcast transmission manner between terminals. For the broadcast transmission mode, the receiving terminal corresponding to each transmitting terminal may be any terminal around the transmitting terminal. As shown in FIG. 8, if the first terminal device is the sending terminal, other terminals around the first terminal device (second terminal device, third terminal device, fourth terminal device, fifth terminal device, sixth terminal device) can be used as the receiving terminal.

Optionally, before introducing specific embodiments of the present application, the applicable scenarios of the present application are introduced first.

Scenario 1: Internet of Vehicles System

Multiple vehicles form a communication group; the cluster header communication device allocates transmission resources for the communication devices in the group. When there are multiple communication groups in the system, resource coordination between multiple communication groups needs to be considered.

Scenario 2: In-Vehicle Communication Scenario

In-vehicle short-distance communication system is mainly used for communication between in-vehicle communication equipment, such as: central controller, audio, microphone, speaker, camera, rearview mirror, driving recorder, 360-degree surround view, door lock, seats, air conditioners, lighting, etc. At present, in the vehicles, the communication between communication devices is usually carried out by wired manner. However, considering factors such as cost reduction, weight reduction, and scalability, it is expected that the existing wired communication will be replaced by wireless communication, to realize the communication between in-vehicle communication devices.

The communication devices in the vehicle can be classified into different communication groups or form different domains. There is a central control node in each communication group, and each central control node can control other communication devices in the communication group, such as allocating transmission resources for other communication devices, performing data transmission with other communication devices in the group, etc.

Multiple communication groups or multiple communication domains can co-exist in the vehicle, and these communication groups usually use the same wireless transmission method. For example, the telematics BOX (T-box) in the vehicle can form a communication group with the microphone and audio in the car; the body controller forms a communication group with the windows, doors, lights, seats, etc.; the central controller in the vehicle forms a communication group with microphones, speakers, rearview mirrors, etc.; the passive entry passive start (PEPS) forms a communication group with door locks and keys.

In practical applications, the communication devices in a vehicle will form multiple communication groups, and the wireless transmission resources will be shared between multiple communication groups. For example, multiple communication groups use the same carrier for data transmission. Therefore, resource coordination and interference avoidance should be considered between multiple communication groups.

Scenario 3: Family or Indoor Scenario

In a smart home scenario, family or indoor communication devices have communication functions, and a communication group can be formed between the communication devices in the home. This communication group usually has a central control node or a cluster header communication device, such as a smart phone, a smart TV, and a consumer premise equipment (CPE); the communication devices in the same family constitute a communication group, and different families have different communication groups, and it is required to consider the resource coordination and interference avoidance between the communication group of one family and the communication group of another family (such as the neighbor).

Scenario 4: Wearable Scenario

With the rapid development of sensor and material technology, all kinds of wearable devices emerge in an endless stream, such as smart glasses, smart watches, etc., and can have communication functions between wearable devices, between wearable devices and mobile phones and other terminals. Usually, other communication devices such as wearable devices and terminals located in the same area can form a communication group, and the communication group can have a central control node or a cluster header communication device, such as a mobile phone. Since different types of wearable devices can form different communication groups, a communication group composed of one type of wearable devices also needs to consider resource coordination and interference avoidance between communication groups composed of other types of wearable devices.

It can be understood that the embodiment of the present application does not limit the above application scenarios, and may also include other scenarios according to actual requirements, which will not be specified here. Optionally, the technical solution of the present application is mainly explained below by taking an in-vehicle short-distance communication system corresponding to an in-vehicle communication scenario as an example.

From the above analysis, it can be known that in a system with multiple communication groups, multiple communication groups usually use the same wireless transmission method for intra-group communication. If multiple communication groups are in the same carrier, at this time when the communication devices in a certain communication group communicate with each other, it may affect the communication between communication devices in other communication groups, and there is a problem of interference between communication groups. Therefore, how to coordinate the transmission resources between multiple communication groups and avoid interference between communication groups is a problem to be solved in the application embodiment.

In view of the above problems, the conception process of the technical solution of the present application includes: in practical applications, since resource multiplexing between communication groups usually includes time-division multiplexing (TDM) and frequency division multiplexing (FDM) way. In practical application, the inventor found that if the FDM method is adopted, and there is no scheduling coordination between the two communication groups, there will be problems such as in-band emission (IBE) and near-far effect, or the like, resulting in strong interference between communication groups. While adopting the TDM mode, there will be no interference between communication groups.

Exemplarily, FIG. 9 is a schematic diagram of sidelink communication between the first communication group and the second communication group using FDM. As shown in FIG. 9, Tx1 and Rx1 belong to the first communication group, and Tx 2 and Rx 2 belong to the second communication group. In the first communication group, Tx1 sends data to Rx1, and in the second communication group, Tx2 sends data to Rx2.

As an example, if the FDM resource multiplexing method is adopted between the first communication group and the second communication group, that is, Tx1 and Tx2 use different frequency domain resources to send data at the same time, although the energy of the signal transmitted by Tx2 and leaked to the frequency domain of Tx1 has an attenuation of more than ten decibels (dB), but because Tx2 is closer to Rx1 than Tx1, the path loss is smaller. Therefore, when Rx1 receives the signal of Tx1, it will be strongly affected by the in-band emission of Tx2, thus reducing the receiving performance of Rx1.

As another example, if the TDM resource multiplexing method is adopted between the first communication group and the second communication group, Tx1 and Tx2 send data at different times, therefore, when Rx1 or Rx2 receives data, there will be no interference between communication groups, and does not have the problem of near-far effect, which can better overcome the interference between communication groups.

Correspondingly, based on the above technical concept, the embodiment of the present application provides a communication method. In a target communication system with multiple communication groups, when a first communication device needs to communicate with other communication devices, firstly the first time-domain resource used by the first communication group where the first communication group is located is determined, wherein the first time-domain resource used by the first communication group is different from the second time-domain resource used by the second communication group, and the first communication group and the second communication group are any two of multiple communication groups coexisting in the target communication system, and secondly, the first time-domain resource is used to communicate with other communication devices in the first communication group. In this technical solution, the transmission resources between multiple communication groups coexisting in the target communication system adopt TDM multiplexing mode, and it is ensured that different communication groups use different time-domain resources, which can effectively avoid interference and improve communication performance between the communication devices.

It can be understood that the communication method provided by the embodiment of the present application can be used in the third generation mobile communication (3rd generation mobile communication, 3G), the long term evolution (LTE) system, the fourth generation mobile communication (4th generation mobile communication, 4G) system, advanced long term evolution (LTE-A), the third generation partnership project (3rd generation partnership project, 3GPP) related cellular system, the fifth generation mobile communication (the 5th generation mobile communication, 5G) system and the subsequent evolution of the communication system, and can also be used in the Internet of Vehicles system or any other D2D system. The embodiment of the present application does not limit the specific implementation form of the communication system.

The network device involved in this embodiment of the application may be an ordinary base station (such as NodeB or eNB or gNB), a new radio controller (NR controller), a centralized network element (centralized unit), a new radio base station, Radio remote module, micro base station, relay, distributed unit, reception point (transmission reception point, TRP), transmission point (TP) or any other equipment, but the embodiments of this application are not limited to this.

The communication device involved in the embodiment of the present application, such as the above-mentioned first terminal device or second terminal device, is a communication device capable of V2X communication, and is a device that provides voice and/or data connectivity to users, for example, handheld devices, in-vehicle devices, and road-side units that have wireless connection functions. Common communication devices include: mobile phones, tablet computers, laptop computers, PDAs, mobile internet devices (MID), wearable devices such as smart watches, smart bracelets, and pedometers.

Hereinafter, the technical solution of the present application will be described in detail through specific embodiments. It should be noted that the following specific embodiments may be combined with each other, and the same or similar concepts or processes may not be repeated in some embodiments.

FIG. 10 is a schematic flowchart of Embodiment 1 of the communication method provided by the embodiment of the present application. This method can be applied to any communication device in a certain communication group, for example, in the embodiment of this application, it is referred to as the first communication device, and the target communication system where the communication group is located includes multiple coexisting communication groups. As shown in FIG. 10, the method may include the following steps:

S101, determining a first time-domain resource used by a first communication group where the first communication device is located, wherein the first time-domain resource used by the first communication group is different from a second time-domain resource used by a second communication group, and the first communication group and the second communication group are any two of a plurality of communication groups coexisting in the target communication system.

In the embodiment of this application, the target communication system is a system based on D2D communication technology. Specifically, it can be any one of the short-distance communication systems formed of various devices such as an Internet of Vehicles system, a short-distance communication system in the vehicle, and an NG system in 5G communication technology. The embodiment of the present application does not limit the specific form of expression of the target communication system, it can be determined according to the scene, and will not be repeated here.

In sidelink communication, if the first communication device needs to communicate with other communication devices, and the target communication system where the first communication device is located includes multiple coexist communication groups, at this time, between any two communication groups, time-division multiplexing can be used for resource allocation. That is, different time-domain resources are used between any two communication groups.

Exemplarily, in the embodiment of this application, the communication group where the first communication device is located is referred to as the first communication group, and any one of the multiple communication groups coexisting in the target communication system except this communication group is referred to as the second communication group. The time-domain resources used by the first communication group are referred to as the first time-domain resources, and the time-domain resources used by the second communication group are referred to as the second time-domain resources. It can be understood that "first" and "second" in this embodiment of the present application are only used to distinguish different communication groups or different time-domain resources, and are not limited to specific communication groups or specific time-domain resources.

Optionally, in practical applications, the first communication device may firstly determine the first communication group where it is located according to the communication group identifier, and then determine the time-domain resources used by the first communication group. Optionally, the time-domain resources respectively used by the first communication group and the second communication group may be pre-configured, or may be determined by the first communication device according to configuration instructions sent by other devices, which is not limited in this embodiment.

S102, communicating with other communication devices in the first communication group using the first time-domain resource.

In the embodiment of the present application, when the first communication device determines the first time-domain resource used by the first communication group it belongs to, it can communicate with other communication devices in the first communication group based on the first time-domain resource. Since different communication groups use different time-domain resources, and the communication devices in each communication group communicate with each other using the time-domain resources corresponding to the communication group they belong to, the communication devices in different communication groups communicate at different times, thus effectively avoiding the interference problem between communication groups.

It can be understood that when the first communication device determines the first time-domain resource used by the communication group it belongs to, it can also determine the first frequency domain resource used by it to communicate with other communication devices, and then use the time-frequency domain resources corresponding to the first time-domain resource and the first frequency domain to communicate. The embodiment of the present application does not limit the manner of determining the first frequency domain resource, which may be determined according to the actual situation, and will not be specified here.

In the communication method provided by the embodiment of the present application, the first communication device determines the first time-domain resource used by the first communication group it belongs to, and uses the first time-domain resource to communicate with other communication devices in the first communication group. Since the first time-domain resource used by the first communication group is different from the second time-domain resource used by the second communication group, and the first communication group and the second communication group are any two among the multiple communication groups coexisting in the target communication system, the communication devices in multiple communication groups that coexist in the target communication system can use different time-domain resources to communicate, thus effectively avoiding interference between communication groups and improving communication performance between communication devices.

Exemplarily, in an embodiment of the present application, the time-domain resources used by each communication group include at least one of the following: a superframe, a radio frame, and a time-domain symbol. At this time, the first time-domain resource used by the first communication group being different from the second time-domain resource used by the second communication group, including:

the first communication group is different from the second communication group in at least one of superframe, radio frame, and time-domain symbol.

In this embodiment, the target communication system is a short-distance wireless communication system, for example, an in-vehicle short-distance communication system, a family or an indoor short-distance communication system. At this time, the frame structure of the time-domain resource may include hierarchies such as superframes, radio frames, and time-domain symbols. The time-domain resources used by each communication group are explained below by taking the short-distance communication system in a vehicle as an example.

In the in-vehicle short-distance communication system, the subcarrier spacing is 480 kHz, and the duration of a radio frame is 20.833 us, including 10 orthogonal frequency division multiplexing (OFDM) symbols, of which 2 OFDM symbols belong to a guard period (GP), which is not used for data transmission, and the remaining 8 OFDM symbols are effective symbols, which can be used for data transmission. The duration of 48 radio frames is 1 ms, corresponding to a superframe. That is, in the in-vehicle short-distance communication system, a superframe includes 48 radio frames, totaling 1 ms; each radio frame includes 10 OFDM symbols.

Optionally, FIG. 11 is a schematic diagram of a frame structure in an in-vehicle short-distance communication system. As shown in FIG. 11, in the in-vehicle short-distance communication system, each superframe includes 48 radio frames, and each radio frame includes 10 OFDM symbols, which can be classified into C link symbols, T Link symbols and guard periods. Among them, the C link is the link where the central control node or the cluster header communication device in the communication group sends data to other communication devices in the group, and the C link symbol is the symbol used for the central control node or the cluster header communication device in the communication group to send data to other communication devices in the group; T link is the link for other communication devices in the group to send data to the central control node or the cluster header communication device, and the T link symbol is the symbol used for other communication devices in the group to send data to the central control node or the cluster header communication device. The C link symbol is located at the beginning of the radio frame, the T link symbol is located at the end of the radio frame, and the GP is located between the C link symbol and the T link symbol, and the last symbol of the radio frame is usually used for receiving-transmitting conversion (or transmitting-receiving conversion).

Optionally, FIG. 11 shows 1 superframe (superframe 0), 2 radio frames (radio frame 0 and radio frame 1), and each radio frame includes 10 symbols. It can be seen from FIG.

11 that there may be different numbers of C-link symbols (or T-link symbols) in different radio frames, which is not limited in this embodiment of the present application.

In practical applications, the duration of OFDM symbols corresponding to GP is usually shorter than the duration of OFDM symbols corresponding to C-link symbols and T-link symbols. The embodiment of the present application does not limit the specific relationship between the duration of the OFDM symbol corresponding to the GP and the duration of the OFDM symbol corresponding to the C-link symbol and the T-link symbol, which will not be specified here.

As an example, in practical applications, if the data or services transmitted by multiple communication groups are not highly demanding on delay, superframe-level TDM resource multiplexing can be performed between multiple communication groups, that is, different communication groups use transmission resources within different superframes.

Optionally, FIG. 12 is a schematic diagram of distribution of different superframes used between communication groups in the short-distance wireless communication system. As shown in FIG. 12, different communication groups may use different superframes for data transmission. Exemplarily, the superframe resources used by the first communication group may include superframe 0, superframe 2, superframe 4, and superframe 6, and the superframe resources used by the second communication group include superframe 1, superframe 3, superframe 5 and superframe 7, so that TDM resource multiplexing at the superframe level is realized between communication groups.

In this example, since the time-domain resources used by the first communication group and the second communication group are different, no interference will occur between the data transmission of the communication devices in the first communication group and the data transmission of the communication devices in the second communication group.

As another example, in the in-vehicle short-distance communication system, multiple communication groups coexisting in the target communication system may also perform resource multiplexing in a radio frame-level TDM manner.

Specifically, the duration of one radio frame is 20.833 us, and in normal cyclic prefix (CP), one radio frame includes 10 OFDM symbols (among them, 8 effective OFDM symbols and 2 guard period symbols); in the extended CP is, one radio frame includes 9 OFDM symbols (including 7 effective OFDM symbols and 2 guard period symbols). Therefore, if multiple communication groups perform resource multiplexing through radio frame-level TDM, since one radio frame is only 20.833 us, the transmission delay of each communication group can be effectively reduced.

Exemplarily, FIG. 13 is a schematic diagram of the distribution of different radio frames used between communication groups in the short-distance wireless communication system. As shown in FIG. 13, a superframe includes 48 radio frames, and the target communication system includes 3 communication groups, which are the first communication group, the second communication group, and the third communication group. These 3 communication groups use different radio frames in superframe 0 to perform TDM resource multiplexing, as shown in FIG. 13 for details.

As another example, in the in-vehicle short-distance communication system, multiple communication groups coexisting in the target communication system may also perform resource multiplexing in a time-domain symbol-level TDM manner. Specifically, one radio frame may include multiple time-domain symbols, and different communication groups may use different time-domain symbols, so as to implement TDM resource multiplexing among communication groups.

In this example, for example, for a noise reduction system, each noise reduction device needs to send data once in a radio frame. At this time, the above-mentioned TDM multiplexing method at the superframe and radio frame level cannot meet the requirements. Therefore, the symbol-level TDM multiplexing is introduced.

Exemplarily, FIG. 14 is a schematic diagram of distribution of different time-domain symbols used between communication groups in a short-distance wireless communication system. As shown in FIG. 14, 1 radio frame includes 10 symbols, among which, 4 C-link symbols, 4 T-link symbols and guard periods respectively set between C-link symbols and T-link symbols (2 symbols). Optionally, in radio frame 0, the first communication group uses 2 C link symbols and 2 T link symbols, and the second communication group uses 2 C link symbols and 2 T link symbols; and in radio frame 1, the first communication group uses 2 C-link symbols and 2 T-link symbols, the second communication group uses 1 C-link symbol and 1 T-link symbol, and the remaining 1 C-link symbol and 1 T-link symbol can be used by other communication groups (such as the third communication group), as shown in FIG. 14 for details.

According to the above analysis, in a short-distance wireless communication system, resource multiplexing between multiple communication groups using TDM may specifically include resource multiplexing at the superframe level, radio frame level, and symbol level. Through resource multiplexing in different dimensions, interference between communication groups can be effectively avoided, and transmission performance between communication devices is improved.

Exemplarily, in another embodiment of the present application, the time-domain resources used by each communication group include at least one of the following: radio frames, subframes, time slots, and time-domain symbols. At this time, the first time-domain resource used by the first communication group being different from the second time-domain resource used by the second communication group, including:

at least one of radio frames, subframes, time slots, and time-domain symbols used by the first communication group and the second communication group is different.

In this embodiment, the target communication system is a new radio wireless communication system, that is, a 3GPP NR system. At this time, the frame structure of time-domain resources may include levels such as radio frames, subframes, time slots, and time-domain symbols. The composition of the frame structure in the 3GPP NR system is briefly introduced as follows.

In the 3GPP NR system, one radio frame is 10 ms, including 10 subframes, and the length of each subframe is 1 ms. Each radio frame includes $10*2^\mu$ time slots, wherein $\mu$ represents a subcarrier spacing configuration parameter, which is used to determine the size of the subcarrier spacing. The number of symbols included in each subframe is equal to the number of slots included in each subframe multiplied by the number of symbols included in each slot.

It can be understood that in the NR system, the subframe length is fixed at 1 ms, and the number of symbols included in each subframe and the length of each symbol are variable. Since the subcarrier spacing is variable, the length of each symbol is reduced as the subcarrier spacing increases. The subframe length is fixed at 1 ms, and thus the number of symbols included in a subframe is increased as the subcarrier spacing increases.

Optionally, Table 1 is a correspondence table between subcarrier spacing configuration parameters and subcarrier spacing. As shown in Table 1, when μ is equal to 0, the subcarrier interval is 15 kHz. At this time, each radio frame includes 10 time slots, and the length of a time slot is 1 ms. When μ is equal to 1, the subcarrier interval is 30 kHz, at this time, the length of a time slot is 0.5 ms, and so on. That is, in the NR system, the length of the time slot depends on the size of the subcarrier spacing, and the duration of the time slot is reduced as the subcarrier spacing increases.

Table 1 Correspondence between subcarrier spacing configuration parameters and subcarrier spacing

| μ | $\Delta f = 2^{\mu} \cdot 15$ [kHz] |
|---|---|
| 0 | 15 |
| 1 | 30 |
| 2 | 60 |
| 3 | 120 |
| 4 | 240 |

Referring to Table 1, in the NR system, according to the value of μ, there are five optional subcarrier intervals, namely 15 k Hz, 30 k Hz, 60 k Hz, 120 k Hz, and 240 k Hz.

Based on the frame structure of the NR system introduced above, if the data or services transmitted by multiple communication groups do not have high requirements for delay, multiple communication groups can perform resource multiplexing at the radio frame level, that is, different communication groups use transmission resources within different radio frames.

Similarly, referring to the above-mentioned short-distance wireless communication system, multiple communication groups can use the multiplexing method of super frame—radio frame—time-domain symbols. In the NR system, multiple communication groups can also use the multiplexing method of radio frame—subframe —slot—time-domain symbol. Regarding the NR system, the implementation of the multiplexing method based on the radio frame—subframe —slot—time-domain symbol is similar to the multiplexing method using the superframe—radio frame—time-domain symbol, and will not be repeated here.

The time-domain resource multiplexing mode among multiple communication groups is introduced above, and the resource configuration of the time-domain resource multiplexing mode is introduced below.

Optionally, in an embodiment of the present application, the above S101 (determining the first time-domain resource used by the first communication group where the first communication device belongs) may be implemented through the following steps:

determining the first time-domain resources used by the first communication group where the first communication device belongs according to pre-configured information.

Optionally, the pre-configuration information is, for example, a protocol specification, or is pre-stored in the first communication device.

The pre-configured information includes: a mapping relationship between communication groups and time-domain resources.

Optionally, the mapping relationship between the communication groups and the time-domain resources is determined based on at least one of the following information: the number of communication devices included in the communication group, and the data characteristics of the services to be transmitted in the communication group.

Exemplarily, for the short-distance communication system, TDM resource multiplexing at a superframe level, a radio frame level, or a symbol level can be implemented by means of system pre-configured information.

Specifically, for the short-distance communication system in the vehicle, several communication groups in the vehicle can usually be known in advance, for example, it can be determined whether the vehicle includes a wireless ignition system, a cockpit control system, a noise reduction system, etc., and the number of communication devices in various systems can be known, as well as some characteristics of service data transmitted in each communication group, such as data packet size, sending frequency, QoS attributes, etc. Therefore, before the vehicle leaves the factory, based on the number of communication devices included in each communication group and/or the data characteristics of the services to be transmitted in the communication group, etc., the mapping relationship between each communication group and the used time-domain resources is pre-configured, that is, different superframe resources, radio frame resources, or time-domain symbol resources are allocated for each communication group by the pre-configuration method, so that different communication groups multiplex transmission resources at different times.

In the embodiment of the present application, when the first communication device has communication needs, it can firstly determine the first communication group it is in, then obtain the pre-configuration information in the system, and then determine the first time-domain resource used by the first communication group according to the mapping relationship between the communication groups and the time-domain resources included in the pre-configuration information.

Optionally, in another embodiment of the present application, the above S101 (determining the first time-domain resource used by the first communication group where the first communication device belongs) may be implemented through the following steps:

The first time-domain resource used by the first communication group is obtained from a resource coordinating node, wherein the resource coordinating node is a node capable of resource allocation in the target communication system.

In practical applications, a node with resource allocation capability can be pre-configured as a resource coordination node in the target communication system. In this way, when the first communication device needs to determine to communicate in the first communication group, it can send a resource allocation request to the resource coordination node, and based on the time domain resource allocated by the resource coordination node, the first time domain resource used by the first communication group is determined.

It should be understood that the resource coordinating node may be a node independent of the multiple communication groups included in the target communication system, for example, the master controller of a vehicle, or may be a cluster header communication device or a central control node in a certain communication group. Here, the specific implementation of the resource coordination node is not limited.

As an example, if there are multiple communication groups in the in-vehicle short-distance communication system, and there may be no information interaction between these communication groups, at this time, a resource coordination resource can be determined in the target resource according to the actual scenario, to allocate transmission resources for each communication group.

As another example, the resource coordinating node is a central control node in a target communication group that satisfies a preset condition in the target communication system.

Optionally, for the target communication system, a target communication group may be determined from a plurality of coexisting communication groups included in the target communication system based on preset preconditions, and then the resource coordination node may be determined in the target communication group. Optionally, the preset conditions may include, but are not limited to, continuous working status, the type of data to be transmitted (such as noise reduction service data), etc., which will not be repeated here.

For the in-vehicle short-distance communication system, although there may be multiple communication groups in the vehicle, not all communication groups have data transmission all the time. For example, the wireless ignition systems, cockpit control systems, etc., only operate under specific conditions, while the noise reduction system will always be in operation as long as the vehicle is ignited. Therefore, the noise reduction system can be used as a basic communication group or communication subsystem, referred to as the target communication group, and then the cluster header communication device or central control node of the target communication group is determined as a resource coordination node, to allocate transmission resources for other communication groups.

Similarly, in this embodiment, the first time-domain resource used by the first communication group obtained from the resource coordinating node may be any one of superframe resource, radio frame resource, and symbol resource, and details are not repeated here.

In addition, in the embodiment of the present application, the obtaining the first time-domain resource used by the first communication group from the resource coordinating node can be achieved in the following manner:

determining the first time-domain resource used by the first communication group according to the resource configuration signaling sent by the resource coordinating node.

Optionally, in the embodiment of the present application, after the resource coordinating node configures time-domain resources for each communication group, it will send it to each communication device in the communication group through resource configuration signaling under certain conditions. Therefore, the first communication device can determine the first time-domain resource used by the first communication group according to the resource configuration signaling received from the resource coordination node.

From the above analysis, it can be seen that time-division resource multiplexing can be realized between different communication groups through pre-configuration or resource coordinating node configuration, and different available time-domain resources are configured for each communication group, effectively avoiding the transmission interference between communication groups.

Exemplarily, the resource coordination node may send the resource configuration signaling to each communication group according to any one of system information (for example, master information block (MIB), system information tion block (SIB)), or radio resource control (RRC), to allocate transmission resources for multiple communication groups.

Exemplarily, the resource configuration signaling includes at least one of the following: a bitmap, a starting position of the first time-domain resource, a length of the first time-domain resource, and a first index.

The bitmap is used to indicate the first time-domain resource used by the first communication group; the bit length in the bitmap is used to determine the repetition period of the first time-domain resource of the first communication group.

Optionally, the resource configuration signaling includes a bitmap, that is, the bitmap is used to indicate the time-domain resource information allocated for the first communication group, for example, superframe resource information, radio frame resource information and/or time-domain symbols information etc.

As an example, when the bitmap is used to indicate the superframe information allocated for the first communication group, it is assumed that the length of the bitmap is M bits, where each bit corresponds to a superframe, that is, the allocated resources are repeated periodically by M superframes, and M is a positive integer.

Exemplarily, according to the schematic diagram of the distribution of superframe resources used by different communication groups shown in FIG. 12, the superframe resources used by the first communication group are superframe 0, superframe 2, superframe 4, and superframe 6, and the superframe resources used by the second communication group are superframe 1, superframe 3, superframe 5, and superframe 7. If the length of the bitmap is 8 bits, the bitmap in the resource configuration signaling received by the first communication group is 10101010, and the bitmap in the resource configuration signaling received by the second communication group is 01010101, namely in every 8 superframes, superframe 0, superframe 2, superframe 4, and superframe 6 are assigned to the first communication group, and superframe 1, superframe 3, superframe 5, and superframe 7 are assigned to the second communication group.

As another example, when using a bitmap to indicate the radio frame information allocated for the first communication group, it is assumed that the length of the bitmap is N bits, wherein each bit corresponds to a radio frame, that is, the allocated resources are repeated periodically by N radio frames, and N is a positive integer.

Exemplarily, according to the schematic diagram of the distribution of radio frames in a superframe shown in FIG. 13, if the length of the bitmap is 8 bits, then in every 8 bit resources starting from radio frame 0, the radio frame resource used by the first communication group is radio frame 1, the radio frame resource used by the second communication group is radio frame 0, radio frame 2, radio frame 4, and super frame 6, and the radio frame resource used by the third communication group is radio frame 3, radio frame 5, radio frame 7. Therefore, the bitmap in the resource configuration signaling received by the first communication group is 01000000, the bitmap in the resource configuration signaling received by the second communication group is 10101010, and the bitmap in the resource configuration signaling received by the third communication group is 00010101, and the available radio frames of each communication group are repeated at a period of 8 radio frames.

It can be understood that, in the embodiment of the present application, the radio frame resource information allocated for the first communication group may also be indicated by means of a two-level bitmap. Wherein, the first-level bitmap includes M bits, which are used to indicate the superframe resources available to the first communication group, and the second-level bitmap includes N bits, which are used to indicate the radio frame information that can be used in the available superframe resources of the first communication group.

Figure 15:
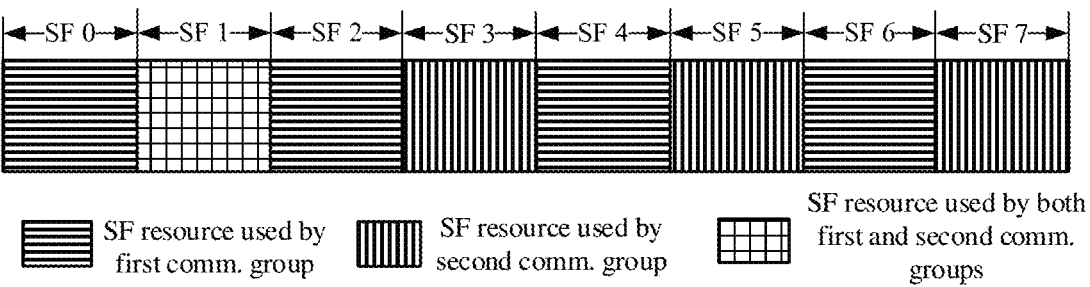
FIG. 15 is a diagram of the distribution of the superframe resources used by the first communication group and the second communication group.
Figure 16:
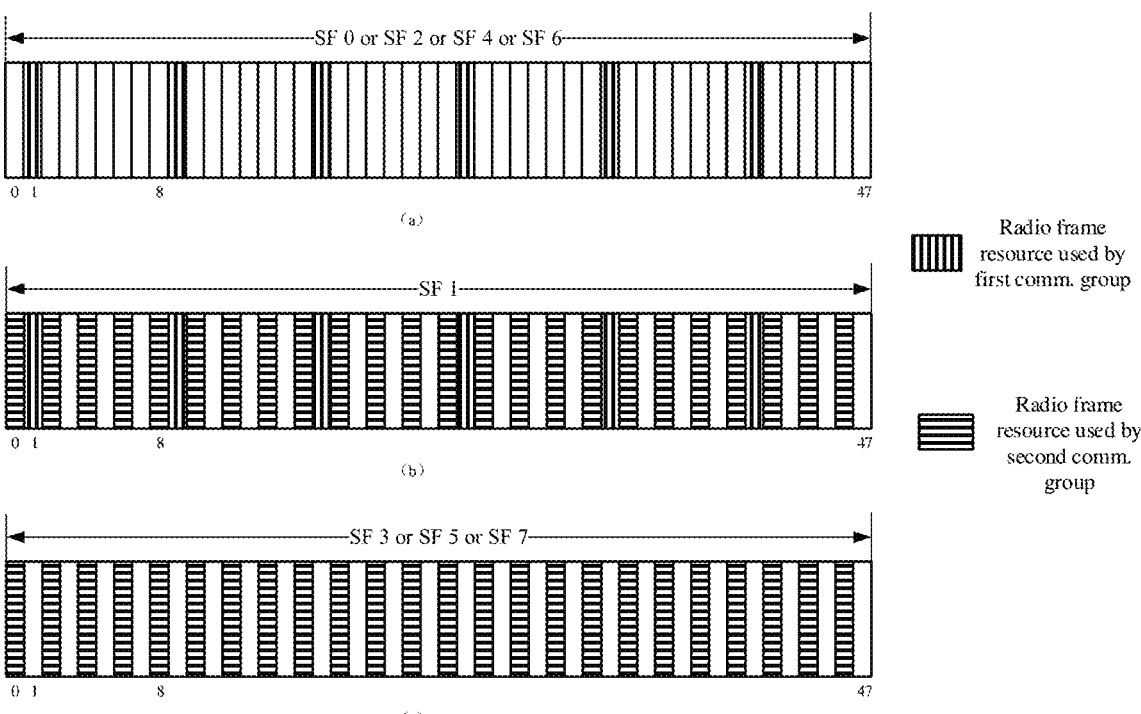
FIG. 16 is a schematic diagram of the distribution of radio frame resources used by the first communication group and the second communication group in each superframe in FIG. 15.

Exemplarily, FIG. 15 is a schematic diagram of distribution of superframe resources used by the first communication group and the second communication group. FIG. 16 is a schematic diagram of the distribution of radio frame resources used by the first communication group and the second communication group in each superframe in FIG. 15. The superframe resources and radio frame resources respectively used by the first communication group and the second communication group shown in FIG. 15 and FIG. 16 can be expressed in the form of two-level bitmaps, and the first-level bitmaps are used to indicate the superframe resources used by the first communication group and the second communication group respectively, and the second-level bitmap is used to indicate the available radio frame resources of each communication group in each superframe resource.

Optionally, for each superframe resource shown in FIG. 15, the length of the first-level bitmap is 8 bits, based on the superframe resources used by the first communication group and the second communication group respectively, the first-level bitmap determined by the first communication group is 11101010, and the first-level bitmap determined by the second communication group is 01010101, wherein the second bit of both the two first-level bitmaps are 1, that is, both the first communication group and the second communication group can use the transmission resource of superframe 1. Since the length of the first-level bitmap is 8 bits, that is, the superframe information that can be used by the first communication group or the second communication group repeats at a period of 8 superframes.

Optionally, referring to the radio frame resources included in each superframe shown in FIG. 16, wherein the (a) of FIG. 16 indicates the allocated radio frame resources in superframe 0 or superframe 2 or superframe 4 or superframe 6, the second-level bitmap determined by the first communication group is 01000000, that is, in superframe 0 or superframe 2 or superframe 4 or superframe 6, the time-domain resources that the first communication group can use are the second radio frame in every 8 radio frames, and it repeats at a period of 8 radio frames.

The (b) in FIG. 16 shows the allocated radio frame resources in superframe 1, that is, in superframe 1, the second-level bitmap determined by the first communication group is 01000000, and the second-level bitmap determined by the second communication group is 10101010, and it repeats at a period of 8 radio frames.

The (c) in FIG. 16 indicates the allocated radio frame resources in superframe 3 or superframe 5 or superframe 7, and the second-level bitmap determined by the second communication group is 10101010, that is, in superframe 3 or superframe 5 or in superframe 7, the time-domain resources that the second communication group can use are the 1st, 3rd, 5th, and 7th radio frames in every 8 radio frames (the corresponding radio frame indexes are 0, 2, 4, and 6), and it repeats with a period of 8 radio frames.

Therefore, as shown in FIG. 15 and FIG. 16, according to the available superframe information for each communication group indicated by the first-level bitmap and the available radio frame information for each communication group in each superframe indicated by the second-level bitmap information, the available superframes and the radio frame information in the corresponding superframes for each communication group can be determined.

As another example, in this embodiment of the present application, a bitmap may also be used to indicate the time-domain symbol information available to the first communication group in one radio frame. Assume that the length of the bitmap is K bits, where each bit corresponds to an effective symbol, and K is a positive integer. Since the number of effective symbols in a radio frame is definite, for example, in the case of a normal CP in a short-distance communication system in a vehicle, a radio frame includes 8 effective symbols. Therefore, optionally, the length K of the bitmap is the same as the number of effective symbols in the radio frame.

Exemplarily, assuming that the length of the bitmap is 8 bits, and 1 bit in the bitmap corresponds to an effective symbol in the radio frame (that is, the guard period symbol is not included), then it can be determined based on the schematic diagram of the distribution of symbol resources used by different communication groups shown in FIG. 14, for radio frame 0 in FIG. 14, the bitmap determined by the first communication group is 11001100, and the bitmap determined by the second communication group is 00110011; for radio frame 1 in FIG. 14, the bitmap determined by the first communication group is 11001100, and the bitmap determined by the second communication group is 00010001.

Optionally, in the embodiment of the present application, the time-domain resource information available to different communication groups may also be indicated in the form of a three-level bitmap. Exemplarily, referring to the schemes shown in FIG. 15 and FIG. 16 that respectively indicate the available superframe resources and the available radio frame information in the superframe resources by the two-level bitmap, further, a third level bitmap can be introduced, and the third level bitmap is used to indicate symbol information in available radio frames. The scheme of indicating the time-domain resource information available to different communication groups by means of three-level bitmap is similar to the above-mentioned scheme of indicating the time-domain resource information available to different communication groups by means of a two-level bitmap, and will not be repeated here.

In another embodiment of the present application, the first time-domain resource used by the first communication group may also be indicated by specifying the starting position of the first time-domain resource, or the first time-domain resource used by the first communication group is indicated by specifying the starting position and the length of the first time-domain resource.

Optionally, when indicating the first time-domain resource used by the first communication group by specifying the starting position of the first time-domain resource, the length of the first time-domain resource may be determined in a pre-configured manner, which is not specified herein.

Exemplarily, it is indicated by specifying the start position and length of available symbols in a radio frame.

For example, referring to the schematic diagram of the distribution of symbol resources used by different communication groups shown in FIG. 14 above, in the radio frame 0 in FIG. 14, for the first communication group, the starting position of the C link symbol is 0 and the length is 2, and the starting position of the T link symbol is 5 and the length is 2; and for the second communication group, the starting position of the C link symbol is 2 and the length is 2, and the starting position of the T link symbol is 7 and the length is 2.

Correspondingly, in the radio frame 1 in FIG. 14, for the first communication group, the starting position of the C link symbol is 0, the length is 2, and the starting position of the T link symbol is 5, and the length is 2; and for the second communication group, the starting position of the C link symbol of the group is 3 and the length is 1, and the starting position of the T link symbol is 8 and the length is 1.

It can be understood that, in some scenarios in the embodiments of the present application, the radio frame information used by each communication group may also be determined by specifying the start position and length of the radio frame. The embodiment of the present application does not limit it, and details are not repeated here.

In another embodiment of the present application, the time-domain resource used by each communication group may be indicated by specifying the index information of the time-domain resource and the corresponding relationship between the index information and the pre-configuration.

Exemplarily, when the resource configuration signaling received by the first communication device from the resource coordination node includes the first index, the above-mentioned determining the first time-domain resource used by the first communication group according to the resource configuration signaling sent by the resource coordination node can be realized through the following steps:

The first time-domain resource used by the first communication group is determined according to the first index and the pre-configured correspondence.

The pre-configured correspondence includes any one of the following: a correspondence between an index and a time slot structure, and a correspondence between an index and a radio frame symbol configuration.

Optionally, the correspondence between time-domain resources and indexes is pre-configured in the first communication device, and when the received resource configuration instruction includes the first index, the first communication device may use the first index and the pre-configured corresponding relationship to determine the first time-domain resource used by the first communication group.

Exemplarily, table 2 is the configuration information of C symbols and T symbols in the radio frame. The first communication device determines the first time-domain resource, that is, the symbol configuration in the radio frame, according to the received first index and the ratio information of C symbols and T symbols in the radio frame shown in table 2.

For example, if the first index is 10, it can determine that the first time-domain resource occupies 4 symbols in the radio frame by looking up the table 2, and then according to the pre-configured starting position of the first time-domain resource or the starting position of the first time-domain resource included in the resource configuration instruction, the position, length, and type of each symbol of the first time-domain resource can be determined.

For example, if the first index is 1, it can determine that the first time-domain resource occupies 8 symbols in the radio frame by looking up the table 2, and then according to the pre-configured starting position of the first time-domain resource or the starting position of the first time-domain resource included in the resource configuration instruction, e.g., the starting position of the first time-domain resource=0 while the length=4, it can be determined that the first time-domain resource is located in 4 symbols starting from the initial position of the radio frame, and the direction of the 4 symbols is to intercept the first 4 of the 8 symbols corresponding to the index.

For another example, if the first index is 2, it can determine that the first time-domain resource occupies 8 symbols in the radio frame by looking up the table 2, and then according to the pre-configured starting position of the first time-domain resource or the starting position of the first time-domain resource included in the resource configuration instruction, e.g., the starting position of the first time-domain resource=4 while the length=4, it can be determined that the first time-domain resource is located in 4 symbols starting from the symbol with index 4 in the radio frame (i.e., the fifth symbol in the radio frame), and the direction of the 4 symbols is to intercept the last 4 of the 8 symbols corresponding to the index.

For another example, if the first index is 2, it can determine that the first time-domain resource occupies 8 symbols in the radio frame by looking up the table 2, and then according to the pre-configured starting position of the first time-domain resource or the starting position of the first time-domain resource included in the resource configuration instruction, e.g., the starting position of the first time-domain resource=2 while the length=4, it can be determined that the first time-domain resource is located in 4 symbols starting from the symbol with index 2 in the radio frame (i.e., the third symbol in the radio frame), and the direction of the 4 symbols is to intercept second symbol to the fifth symbol of the 8 symbols corresponding to the index, or the direction of the 4 symbols is to intercept the first 4 of the 8 symbols corresponding to the index, or the direction of the 4 symbols is to intercept the last 4 of the 8 symbols corresponding to the index.

TABLE 2

| configuration type | \multicolumn{8}{c}{configuration information of C symbol and T symbol in radio frame} |
| | symbol configuration | | | | | | | |
| | 0 | 1 | 2 | 3 | 4 | 5 | 6 | 7 |
| --- | --- | --- | --- | --- | --- | --- | --- | --- |
| 0 | C | T | T | T | T | T | T | T |
| 1 | C | C | T | T | T | T | T | T |
| 2 | C | C | C | T | T | T | T | T |
| 3 | C | C | C | C | T | T | T | T |
| 4 | C | C | C | C | C | T | T | T |
| 5 | C | C | C | C | C | C | T | T |
| 6 | C | C | C | C | C | C | C | T |
| 7 | C | C | C | T | T | | | |
| 8 | C | C | T | T | T | | | |
| 9 | C | C | T | T | | | | |
| 10 | C | C | C | T | | | | |
| 11 | C | C | T | | | | | |
| 12 | C | T | T | | | | | |

It can be understood that, in some scenarios in the embodiments of the present application, the radio frame information used by each communication group may also be determined by specifying the corresponding relationship between the index and the radio frame symbol configuration. The embodiment of the present application does not limit it, and details are not repeated here.

The above embodiments and the accompanying drawings are based on the time division multiplexing scheme of the present application introduced based on the frame structure in the short-distance wireless communication system. The technical scheme of the present application is also applicable to the new radio wireless communication system, and will not be repeated here.

As can be seen from the above analysis, in the embodiment of the present application, in the target communication system where multiple communication groups coexist, by limiting the use of different time-domain resources for different communication groups, the interference problem between communication groups is effectively avoided, and the transmission performance between communication devices is improved.

The above describes the specific implementation of the communication method mentioned in the embodiment of the present application. The following is the embodiment of the apparatus of the present application, which can be used to implement the method embodiment of the present application. For details not disclosed in the apparatus embodiments of the present application, please refer to the method embodiments of the present application.

Figure 17:
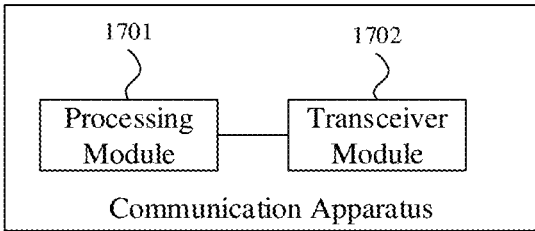
FIG. 17 is a schematic structural diagram of Embodiment 1 of a communication apparatus provided by the present application.

FIG. 17 is a schematic structural diagram of Embodiment 1 of a communication apparatus provided in this application. The apparatus may be integrated in the first communication device, or implemented by the first communication device. As shown in FIG. 17, the communication apparatus may include: a processing module 1701 and a transceiver module 1702.

The processing module 1701 is configured to determine a first time-domain resource used by a first communication group where a first communication device belongs, the first time-domain resource used by the first communication group and a second time-domain resource used by a second communication group are different, the first communication group and the second communication group are any two of a plurality of communication groups coexisting in a target communication system.

The transceiver module 1702 is configured to communicate with other communication devices in the first communication group using the first time-domain resource.

In a possible design of the embodiment of the present application, the time-domain resources used by each communication group includes at least one of the following: superframes, radio frames, and time-domain symbols;

the first time-domain resource used by the first communication group being different from the second time-domain resource used by the second communication group, includes:

at least one of the superframes, radio frames, and time-domain symbols used by the first communication group and the second communication group are different.

In a possible design of the embodiment of the present application, the time-domain resources used by each communication group includes at least one of the following: radio frames, subframes, time slots, and time-domain symbols;

the first time-domain resource used by the first communication group being different from the second time-domain resource used by the second communication group, includes:

at least one of the radio frames, subframes, time slots, and time-domain symbols used by the first communication group and the second communication group are different.

In a possible design of the embodiment of the present application, the processing module 1701 is further configured to determine the first time-domain resource used by the first communication group where the first communication device is located according to pre-configured information, wherein the pre-configured information includes: a mapping relationship between communication groups and a time-domain resources.

Optionally, the mapping relationship between the communication groups and the time-domain resources is determined based on at least one of following information: the number of communication devices in the communication group, or data characteristics of the services to be transmitted in the communication group.

In a possible design of the embodiment of the present application, the processing module 1701 is further configured to: obtain the first time-domain resource used by the first communication group from a resource coordinating node, wherein the resource coordinating node is a node capable of resource allocation in the target communication system.

Optionally, the resource coordinating node is a central control node in a target communication group satisfying a preset condition in the target communication system.

Exemplarily, the processing module 1701 being configured to obtain the first time-domain resource used by the first communication group from the resource coordinating node, further includes:

the processing module 1701 is further configured to determine the first time-domain resource used by the first communication group according to a resource configuration signaling sent by the resource coordination node.

In a possible design of the embodiment of the present application, the resource configuration signaling includes at least one of: a bitmap, and a combination of a starting position and length of the first time-domain resource, the bitmap is configured to indicate the first time-domain resource used by the first communication group.

Optionally, a bit length in the bitmap is used to determine a repetition period of the first time-domain resource of the first communication group.

In a possible design of the embodiment of the present application, when the resource configuration signaling includes the first index, the processing module is further configured to determine the first time-domain resource used by the first communication group according to the first index and a pre-configured correspondence.

Optionally, the pre-configured correspondence includes any one of:

a corresponding relationship between indexes and time slot structures, or a corresponding relationship between indexes and radio frame symbol configurations.

The apparatus provided in this embodiment is used to implement the technical solutions of the embodiments shown in the aforementioned methods, and its implementation principles and technical effects are similar, and will not be repeated here.

It should be noted that it should be understood that the division of each module of the above apparatus is only a division of logical functions, and may be fully or partially integrated into one physical entity or physically separated during actual implementation. And these modules can all be implemented in the form of calling software through processing elements; they can also be implemented in the form of hardware; some modules can also be implemented in the form of calling software through processing elements, and some modules can be implemented in the form of hardware. For example, the processing module can be a separate processing element, or it can be integrated in a chip of the above-mentioned apparatus. In addition, it can also be stored in the memory of the above-mentioned apparatus in the form of program code, and a certain processing element of the above-mentioned device can call and execute the functions of the modules described above. The implementation of other modules is similar. In addition, all or part of these modules can be integrated together, and can also be implemented independently. The processing element mentioned here may be an integrated circuit with signal processing capabilities. In the implementation process, each step of the above method or each module above can be completed by an integrated logic circuit of hardware in the processor element or an instruction in the form of software.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be generated in whole or in part. The computer can be a general purpose computer, a special purpose computer, a computer network, or other programmable apparatus. The computer instructions may be stored in a computer-readable storage medium or transmitted from one computer-readable storage medium to another computer-readable storage medium, for example, the computer instructions may be transmitted from a website, computer, server or data center to another website site, computer, server, or data center by wired (e.g., coaxial cable, fiber optic, digital subscriber line (DSL)) or wireless (e.g., infrared, wireless, microwave, etc.) means. The computer-readable storage medium may be any available medium that can be accessed by a computer, or a data storage device such as a server or a data center integrated with one or more available media. The available medium may be a magnetic medium (for example, a floppy disk, a hard disk, or a magnetic tape), an optical medium (for example, DVD), or a semiconductor medium (for example, a solid state disk (SSD)) and the like.

Exemplarily, an embodiment of the present application further provides a communication apparatus, the communication apparatus includes a processor, and the processor is configured to call and run a computer program from a memory, so that the device installed with the communication apparatus executes the technical solution of the above method embodiment.

Figure 18:
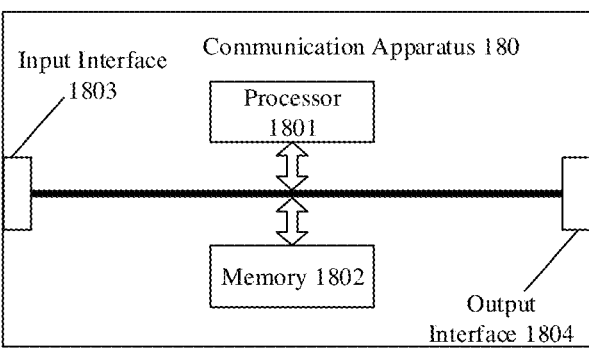
FIG. 18 is a schematic structural diagram of Embodiment 2 of a communication apparatus provided by the present application.

FIG. 18 is a schematic structural diagram of Embodiment 2 of a communication apparatus provided by the present application. As shown in FIG. 18, the communication apparatus 180 includes a processor 1801, and the processor 1801 can call and run a computer program from a memory, so as to implement the method in the embodiment of the present application.

Optionally, as shown in FIG. 18, the communication apparatus 180 may further include a memory 1802. The processor 1801 can call and run a computer program from the memory 1802, so as to implement the method in the embodiment of the present application.

The memory 1802 may be an independent device independent of the processor 1801, or may be integrated in the processor 1801.

Optionally, the communication device 180 may also include an input interface 1803. The processor 1801 may control the input interface 1803 to communicate with other devices or devices, specifically, may obtain information or data sent by other devices or devices.

Optionally, the communication device 180 may further include an output interface 1804. The processor 1801 may control the output interface 1804 to communicate with other devices or devices, specifically, may output information or data to other devices or devices.

Optionally, the apparatus can be applied to the communication device in the embodiment of the present application, and the apparatus can implement the corresponding process implemented by the communication device in each method of the embodiment of the present application. For the sake of brevity, details are not repeated here.

It should be understood that the apparatus mentioned in the embodiment of the present application may be a chip, and the chip may also be referred to as a system level chip, a system chip, a chip system, or a system-on-chip.

Figure 19:
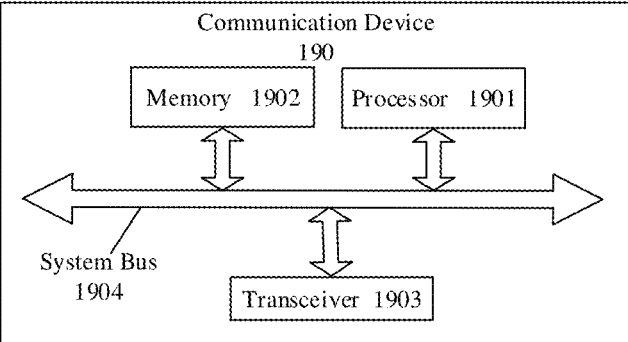
FIG. 19 is a structural diagram of a communication device provided by an embodiment of the present application.

FIG. 19 is a structural diagram of a communication device provided by an embodiment of the present application. As shown in FIG. 19, the communication device 190 includes a processor 1901 and a memory 1902. The memory 1902 stores computer instructions that can be run on the processor 1901, so that the processor 1901 can call and run the computer program from the memory 1902, so as to implement the method in the embodiment of the present application.

Optionally, as shown in FIG. 19, the communication device 190 may further include a transceiver 1903, and the processor 1901 may control the transceiver 1903 to communicate with other devices, specifically, to send information or data to other devices, or receive information or data sent by other devices.

The transceiver 1903 may include a transmitter and a receiver. The transceiver 1903 may further include antennas, and the number of antennas may be one or more.

Optionally, the communication device may further include a system bus 1904, through which the memory 1902 and the transceiver 1903 are connected to the processor 1901 to complete mutual communication.

It can be understood that the communication device 190 can specifically be the first communication device in the embodiment of the present application, which can implement the corresponding processes implemented by the first communication device in each method of the embodiment of the present application. For the sake of brevity, it will not be repeated herein.

It should be understood that the processor in the embodiment of the present application may be an integrated circuit chip, which has a signal processing capability. In the implementation process, each step of the above-mentioned method embodiments may be completed by an integrated logic circuit of hardware in a processor or instructions in the form of software. The above-mentioned processor may be a general-purpose processor, a digital signal processor (DSP), an application specific integrated circuit (ASIC), a field programmable gate array (FPGA) or other available programmable logic devices, discrete gate or transistor logic devices, discrete hardware components.

It can be understood that the memory in the embodiments of the present application may be a volatile memory or a nonvolatile memory, or may include both volatile and non-volatile memories. Among them, the non-volatile memory can be read-only memory (ROM), programmable read-only memory (programmable ROM, PROM), erasable programmable read-only memory (erasable PROM, EPROM), electrically programmable erasable programmable read-only memory (electrically EPROM, EEPROM) or flash memory. Volatile memory can be random access memory (RAM), which acts as external cache memory.

Figure 20:
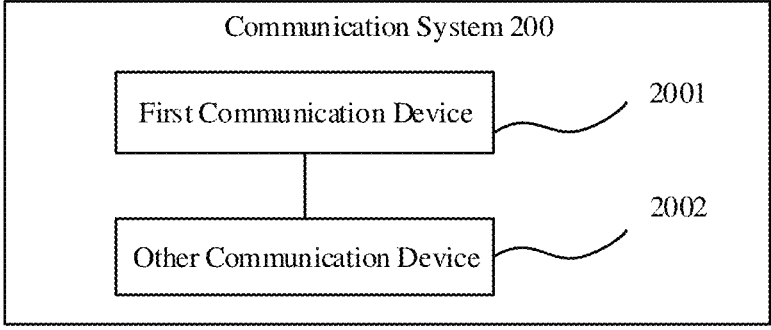
FIG. 20 is a schematic structural diagram of a communication system provided by an embodiment of the present application.

FIG. 20 is a schematic structural diagram of a communication system provided by an embodiment of the present application. As shown in FIG. 20, the communication system 200 includes a first communication device 2001 and other communication device 2002.

The first communication device 2001 may be used to implement the corresponding functions implemented by the first communication device in the above method, and for the sake of brevity, details are not repeated here.

Exemplarily, the communication system may be referred to as an Internet of Vehicles system or a D2D system.

Optionally, in this embodiment of the present application, the other communication device 2002 may be a terminal device or a network device. When the other communication device 2002 is a network device, it may provide services for the first communication device 2001. In this embodiment, for the specific implementation manner of the first communication device 2001, reference may be made to the records in the foregoing embodiments, and details are not repeated here.

The embodiment of the present application also provides a computer-readable storage medium, wherein computer instructions are stored in the computer-readable storage medium, and when the computer instructions are executed by a processor, they are used to implement the technical solutions of the aforementioned method embodiments.

The embodiment of the present application further provides a program, which is used to execute the technical solutions of the foregoing method embodiments when the program is executed by a processor.

The embodiment of the present application also provides a computer program product, including program instructions, and the program instructions are used to implement the technical solutions of the aforementioned method embodiments.

The embodiment of the present application also provides a chip, including: a processing module and a communication interface, wherein the processing module can execute the technical solutions of the aforementioned method embodiments.

Further, the chip further includes a storage module (such as a memory), the storage module is used to store instructions, and the processing module is used to execute the instructions stored in the storage module, and the execution of the instructions stored in the storage module makes the processing module perform the technical solutions of the aforementioned method embodiments.

Exemplarily, the chip may include a memory and a processor. Codes and data are stored in the memory. The memory is coupled to the processor. The processor runs the code in the memory so that the chip is used to execute the technical solutions of the above method embodiments.

In the several embodiments provided in this application, it should be understood that the disclosed system, apparatus and method can be implemented in other ways. For example, the apparatus embodiments described above are only illustrative. For example, the division of the units is only a logical function division. In actual implementation, there may be other division methods. For example, multiple units or components can be combined or be integrated into another system, or some features may be ignored, or not implemented. In another point, the mutual coupling or direct coupling or communication connection shown or discussed may be through some interfaces, and the indirect coupling or communication connection of apparatus or units may be in electrical, mechanical or other forms.

In this application, "at least one" means one or more, and "multiple" means two or more. The term "and/or", describes the association relationship of associated objects, and means that there can be three kinds of relationships, for example, A and/or B, can mean: A exists alone, A and B exist at the same time, and B exists alone, wherein A, B can be singular or plural. The character "/" generally indicates that the contextual objects are an "or" relationship; in the formula, the character "/" indicates that the contextual objects are a "division" relationship. "At least one of the following" or similar expressions refer to any combination of these items, including any combination of single or plural items.

It can be understood that the various numbers involved in the embodiments of the present application are only for convenience of description, and are not used to limit the scope of the embodiments of the present application. The sequence numbers of the above-mentioned processes do not mean the order of execution, and the execution order of each process should be determined by its functions and internal logic, and should not constitute any limitation on the implementation process of the embodiments of the present application.

What is claimed is:

1. A communication method, applied to a first communication device, the method comprising:

determining a first time-domain resource used by a first communication group where the first communication device is located according to a bitmap, where the first time-domain resource used by the first communication group is different from a second time-domain resource used by a second communication group, and the first communication group and the second communication group are any two of a plurality of communication groups coexisting in a target communication system; and communicating with other communication devices in the first communication group using the first time-domain resource, wherein the bitmap is configured to indicate the first time-domain resource used by the first communication group, the first time-domain resource comprises: superframe resource information, radio frame resource information, or time-domain symbol resource information, the bitmap comprises a first-level bitmap, a second-level bitmap and a third-level bitmap, and wherein the first-level bitmap is configured to indicate the superframe resource information, the second-level bitmap is configured to indicate the radio frame resource information, and the third-level bitmap is configured to indicate the time-domain symbol resource information.

2. The method according to claim 1, wherein the first time-domain resource used by the first communication group and the second time-domain resource used by the second communication group each comprises time-domain symbols;

the first time-domain resource used by the first communication group being different from the second time-domain resource used by the second communication group, comprises:

the time-domain symbols used by the first communication group and the second communication group are different.

3. The method according to claim 1, wherein the determining the first time- domain resource used by the first communication group where the first communication device is located comprises:

obtaining the first time-domain resource used by the first communication group from a resource coordinating node, wherein the resource coordinating node is a node capable of resource allocation in the target communication system.

4. The method according to claim 3, wherein the resource coordinating node is a central control node in a target communication group satisfying a preset condition in the target communication system.

5. The method according to claim 3, wherein the obtaining the first time- domain resource used by the first communication group from the resource coordinating node comprises:

determining the first time-domain resource used by the first communication group according to a resource configuration signaling comprising the bitmap sent by the resource coordination node.

6. The method according to claim 3, wherein the resource coordinating node sends a resource configuration instruction to the first communication group by broadcasting information.

7. The method according to claim 6, wherein the resource coordinating node is a cluster header terminal or a central control node in another communication group.

8. The method according to claim 1, wherein a bit length in the bitmap is used to determine a repetition period of the first time-domain resource of the first communication group.

9. The method according to claim 1, wherein:
a length of the first-level bitmap is M bits, and each bit corresponds to one superframe, wherein M is a positive integer.

10. The method according to claim 1, wherein:
a length of the second-level bitmap is N bits, and each bit corresponds to one radio frame, wherein N is a positive integer.

11. The method according to claim 1, wherein the third-level bitmap is configured to indicate a time-domain symbol information available to the first communication group in one radio frame, wherein a length of the third-level bitmap is K bits, and each bit in the third-level bitmap corresponds to one effective symbol, and K is a positive integer.

12. The method according to claim 1, wherein the first communication group comprises a plurality of terminal devices, and the plurality of terminal devices comprise a central control node, and wherein the central control node has a function of performing resource coordination with other communication groups.

13. The method according to claim 12, wherein the central control node is configured to allocate transmission resource for other terminal devices in the first communication group, or performing data transmission with other terminal devices in the first communication group.

14. The method according to claim 1, wherein the determining the first time-domain resource used by the first communication group where the first communication device is located, comprises:

determining the first communication group where the first communication device is located according to a communication group identifier; and determining the time-domain resource used by the first communication group.

15. A communication apparatus, comprising a processor;
the processor is configured to invoke and run a computer program from a memory, to enable a first communication device installed with the apparatus to execute a communication method, the method comprising:

determining a first time-domain resource used by a first communication group where the first communication device is located according to a bitmap, where the first time-domain resource used by the first communication group is different from a second time-domain resource used by a second communication group, and the first communication group and the second communication group are any two of a plurality of communication groups coexisting in a target communication system; and communicating with other communication devices in the first communication group using the first time-domain resource, wherein the bitmap is configured to indicate the first time-domain resource used by the first communication group, the first time-domain resource comprises: superframe resource information, radio frame resource information, or time-domain symbol resource information, the bitmap comprises a first-level bitmap, a second-level bitmap and a third-level bitmap, and wherein the first-level bitmap is configured to indicate the superframe resource information, the second-level bitmap is configured to indicate the radio frame resource information, and the third-level bitmap is configured to indicate the time-domain symbol resource information.

16. The communication apparatus according to claim 15, wherein the first time-domain resource used by the first communication group and the second time-domain resource used by the second communication group each comprises time-domain symbols;

the first time-domain resource used by the first communication group being different from the second time-domain resource used by the second communication group, comprises:

the time-domain symbols used by the first communication group and the second communication group are different.

17. A communication device, comprising:
a processor, a memory, a transceiver, and an interface to communicate with other devices;

the memory is configured to store computer instructions;

the processor is configured to execute the computer instructions stored in the memory, to enable the processor to execute a communication method, the method comprising:

determining a first time-domain resource used by a first communication group where the communication device is located according to a bitmap, where the first time-domain resource used by the first communication group is different from a second time-domain resource used by a second communication group, and the first communication group and the second communication group are any two of a plurality of communication groups coexisting in a target communication system; and communicating with other communication devices in the first communication group using the first time-domain resource, wherein the bitmap is configured to indicate the first time-domain resource used by the first communication group, the first time-domain resource comprises: superframe resource information, radio frame resource information, or time-domain symbol resource information, the bitmap comprises a first-level bitmap, a second-level bitmap and a third-level bitmap, and wherein the first-level bitmap is configured to indicate the superframe resource information, the second-level bitmap is configured to indicate the radio frame resource information, and the third-level bitmap is configured to indicate the time-domain symbol resource information.

* * * * *